Aug. 3, 1965   J. C. BOND, JR., ETAL   3,197,814
SCREW CONSTRUCTION FOR EXTRUSION APPARATUS AND THE LIKE
Filed July 9, 1962

INVENTORS
JAMES CLARENCE BOND, JR.
WILLIAM DALE SNELLING

BY *Harry C. Braddock*
ATTORNEY

3,197,814
SCREW CONSTRUCTION FOR EXTRUSION APPARATUS AND THE LIKE

James Clarence Bond, Jr., Orange, and William Dale Snelling, Port Neches, Tex., assignors to E. I. du Pont de Nemours and Company, Wilmington, Del., a corporation of Delaware
Filed July 9, 1962, Ser. No. 208,249
2 Claims. (Cl. 18—12)

This invention relates to the field of apparatus which utilizes a helical screw member to move a mass of material through a cylindrical bore or passageway of a casing member. More specifically, this invention involves an improved screw member construction and improved cooperation between the improved screw member and the casing or cylinder member of the extrusion apparatus.

Conventional apparatus having a mechanism of the rotary screw type for applying pressure to the material being treated has utilized generally a screw member with an external diameter which is closely fitted to a passageway or cylindrical bore of the apparatus in which the screw is rotated. As is the case with the present invention, the bore need not be of constant diameter. In these prior art mechanisms there has been significant engagement and contact between the screw member and the bore substantially along the entire length of the srew member. Perhaps this has been done to ensure that little of the material being treated escapes the action of the turning screw member. In any event, this type construction and engagement between the screw member and its bore interior surface has been found to cause excessive wear of the bore interior surface, vibration, and wasted power. Serious limitations have had to be imposed on the operating speeds of screw member rotation in order to keep these undesirable conditions within limits which would permit reasonably continuous operation of the equipment.

It is one object of this invention to provide an improved and novel screw member construction having improved cooperation with its cylinder member such that the prior art defects and undesirable operating conditions are substantially eliminated or overcome.

It is a further object to provide an improved screw member-cylinder member arrangement which is simple and economical to fabricate, install, and maintain, yet rugged and reliable in operation.

Other objects and advantages will appear from a consideration of the following specification and the accompanying drawings in which.

Figure 1:
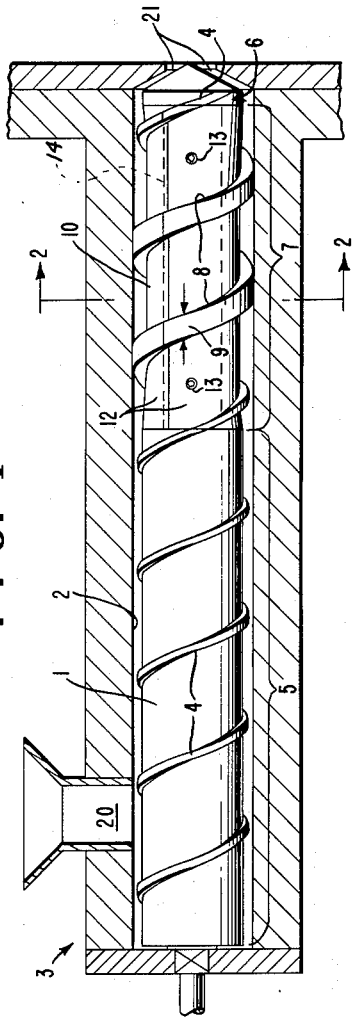
FIGURE 1 is a longitudinal sectional view of a typical or illustrative screw extruder apparatus embodying features of this invention.
Figure 2:
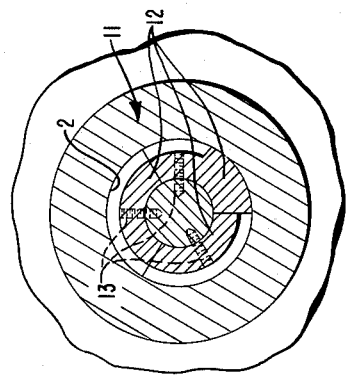
FIGURE 2 is a transverse cross-sectional view of the apparatus of FIGURE 1 taken at line 2—2.

One preferred embodiment of the invention is illustrated on the figures of the drawing. In FIGURE 1 there is shown the screw member 1 rotatably mounted in the bore 2 of the extrusion apparatus indicated generally at 3 which is provided with an inlet 20 and an outlet 21. The screw member 1 is provided with the substantially helical surface 4 along its length at portions 5 and 6. The screw member is rotated by suitable means, not shown. The portions 5 and 6 are provided with transverse dimensions such that there is a definite clearance between the outer surfaces of the helical surface 4 and the interior of bore 2. Portions 5 and 6 and the corresponding portions of the bore interior need not be of constant tranverse dimensions. Screw member 1 is provided at at least one position along its length with a portion 7 having an increased transverse dimension or radius closely fitting and engaging the interior surface of the bore 2. Preferably, this portion 7 of increased radius is provided with a helical surface 8 of increased outer dimension which surface is a smoothly faired extension of the helical surface 4 of portions 5 and 6. The screw structure defining surface 8 may be given an increased axial dimension 9 to provide added bearing surface, if desired. This would be compensated for by making the cutaway portions 10 deeper between the helical turns to provide unrestricted flow of material from portion 5 to portion 6.

A shown in the drawings the portion 7 of increased radius is formed by a collar unit 11 surrounding the screw member 1. Preferably the collar unit is made up of a plurality of circumferentially extending segments 12 secured by bolts or machine screws 13 in an annular recess 14 formed on the screw element 1. Segments 12 are easily replaceable and are preferably made of a strong material having suitable rigidity and wear properties. It has been found that cast iron has highly desirable and satisfactory properties, and has been successfully used to fabricate segments 12. It is not necessary that the segments 12 be provided with the helical surface 8. These segments may be formed to give the required contact and bearing area at circumferentially spaced points to support the screw properly and permit the movement of material between the bearing points as desired. The screw portion 7 of increased radius provides radial bearing support to maintain a radial clearance between the outer periphery of screw member portions 5 and 6 and greatly reduce the frictional forces between the screw member and its surrounding bore. When a certain amount of wear occurs on the segments 12 the screw member is removed and the worn segments replaced. An alternate screw member with new segments could be immediately installed to keep equipment "down time" to a minimum.

It has been found far more economical and advantageous to replace the worn bearing segments on the screw member than to replace or rebuild the structure in which the bore is formed, as was necessary before the segments were installed. Rotating speeds may be increased far beyond previous limits and much higher production levels achieved without critical wear.

The small clearance provided along most of the screw member length has been carefully controlled and has not significantly affected the treatment given the material passing through the apparatus. It has also been possible as a result of this invention, to reduce the requirement for providing a hardened wear-resistant layer on the interior of the bore 2 and helical surface 4.

It is believed clear that we have provided a novel and highly useful improvement in screw member-cylinder construction.

While we have disclosed a single preferred embodiment of apparatus embodying our invention, it is believed that other modifications and versions of such apparatus within the spirit of this invention will occur to those skilled in the art, and all such are considered to fall within the scope of the following claims.

We claim:
1. An improved extrusion apparatus for applying pressure to and moving a mass of material in an elongated passageway from a first position to a second position axially spaced from said first position, said apparatus comprising, in combination, a housing member, the structure of said housing member defining an elongated passageway having an interior surface of a circular transverse cross section, an elongated extrusion screw member mounted and aligned for rotation about an axis relative to the passageway in said housing member about an axis, said extrusion screw member comprising a first axially extending portion positioned in said passageway, said first portion provided with at least one integrally formed substantially helical material engaging and impelling surface extending longitudinally thereof, the outer periphery of said helical surface of said first portion along its length having an external diameter less than the corresponding internal diameter of said passageway in which said extrusion screw member is positioned, said extrusion screw member further comprising at least one other axially extending portion in a given zone in said passageway, said other portion comprising a radially extending and radially enlarged rotary bearing means in engagement with the interior surface of said passageway in said given zone for maintaining a predetermined radial clearance between said first portion of said screw member and the corresponding interior surface of said passageway, and for reducing frictional forces between said housing member and said extrusion screw member, said other portion defining at least one channel for movement of material longitudinally along said screw member and through said given zone in said passageway, said bearing means comprising at least one peripherally extending contact surface for engagement with the interior surface of said passageway, the material defining said contact surface of said bearing means having wear characteristics inferior to those of the material defining interior surface of said passageway, said contact surface of said rotary bearing means comprising a helical configuration smoothly joined with the substantially helical material impelling surface of said screw member first portion to assist in moving material through said given zone, the helical configuration of said rotary bearing contact surface having a pitch smaller than the helical portion of said first portion of said screw member.

2. The improved apparatus of claim 1 in which said bearing means comprises a collar unit surrounding said screw member said collar unit provided in said given zone at each of successively axially spaced planes transverse to the axis of said screw with a successively circumferentially spaced radially projecting wear surfaces for engagement with the interior of said passageway, said contact surface of said rotary bearing means comprising a helical configuration smoothly joined with the substantially helical material impelling surface of said screw member first portion to assist in moving material through said given zone, the helical configuration of said rotary bearing contact surface having a pitch smaller than the helical portion of said first portion of said screw member, said collar unit comprising a plurality of segments removably secured to said shaft in said given zone, the outer dimension of said segments closely fitted to the interior of said passageway.

References Cited by the Examiner

UNITED STATES PATENTS

| | | | |
|---|---|---|---|
| 665,262 | 1/01 | Peck | 198—213 |
| 1,379,307 | 5/21 | Lower | 198—213 |
| 1,966,325 | 7/34 | Welch | 198—213 |
| 2,680,879 | 6/54 | Schnuck. | |
| 2,990,942 | 7/61 | Smith | 198—214 |

SAMUEL F. COLEMAN, *Primary Examiner.*

WILLIAM B. LA BORDE, ERNEST A. WALLER, Jr.,
*Examiners.*